(12) United States Patent
Nania et al.

(10) Patent No.: US 6,446,990 B1
(45) Date of Patent: Sep. 10, 2002

(54) TRANSPORT VEHICLE FOR AN INFANT OF LOW AGE

(75) Inventors: Franck Nania, Groslee; Shlomi Tal, Pont De Cheruy, both of (FR)

(73) Assignee: Team Tex, Saint Quentin.Fallavier (FR)

( * ) Notice: Subject to any disclaimer, the term of this patent is extended or adjusted under 35 U.S.C. 154(b) by 0 days.

(21) Appl. No.: 09/257,908

(22) Filed: Feb. 25, 1999

(30) Foreign Application Priority Data

Feb. 26, 1998 (FR) .............................................. 98 02564

(51) Int. Cl.$^7$ ................................................. B62B 3/00
(52) U.S. Cl. ............................. 280/47.371; 280/47.379; 280/47.38; 280/41; 280/643; 280/647; 280/648; 280/658
(58) Field of Search .......................... 280/30, 643, 647, 280/648, 658, 47.38, 47.379, 47.41, 47.371; 297/250

(56) References Cited

U.S. PATENT DOCUMENTS

| | | | |
|---|---|---|---|
| 4,664,396 A | | 5/1987 | Pietrafesa |
| 4,943,113 A | * | 7/1990 | Meeker ........................ 297/250 |
| 5,133,567 A | | 7/1992 | Owens |
| 5,188,380 A | | 2/1993 | Tucek |
| 5,201,535 A | * | 4/1993 | Kato et al. ..................... 280/30 |
| 5,203,577 A | * | 4/1993 | Kato et al. ................... 280/643 |
| 5,257,799 A | * | 11/1993 | Cone et al. ............. 280/647 X |
| 5,364,137 A | * | 11/1994 | Shimer ........................ 297/250 |
| 5,499,831 A | * | 3/1996 | Worth et al. .................... 280/30 |
| 5,676,386 A | * | 10/1997 | Huang ........................... 280/30 |
| 5,727,798 A | * | 3/1998 | Walters et al. ................. 280/30 |
| 5,772,279 A | * | 6/1998 | Johnson, Jr. .............. 280/30 X |
| 5,820,144 A | * | 10/1998 | Wang ........................ 280/30 X |
| 5,823,547 A | * | 10/1998 | Otobe et al. ................... 280/30 |
| 5,865,447 A | * | 2/1999 | Huang ........................... 280/30 |
| 5,876,046 A | * | 3/1999 | Courtney et al. ............. 280/30 |
| 5,947,555 A | * | 9/1999 | Welsh, Jr. et al. ......... 280/30 X |
| 6,070,890 A | * | 6/2000 | Haut et al. ................ 280/30 X |
| 6,286,844 B1 | * | 9/2001 | Cone et al. .................. 280/643 |

FOREIGN PATENT DOCUMENTS

DE              295 18371 U1     11/1995

* cited by examiner

*Primary Examiner*—Paul N. Dickson
*Assistant Examiner*—Toan C To
(74) *Attorney, Agent, or Firm*—Fay, Sharpe, Fagan, Minnich & McKee, LLP (57) ABSTRACT

A stroller push cart (1) for a young infant, including an infant carrier (2) and a frame (3) equipped with wheels (23) on which the infant carrier can be mounted. The infant carrier (2) includes a shell (5) and a handle (6) and presents a relatively rigid structure. The ends of the handle (6) are mounted in a pivoting fashion on opposite sides of the infant carrier (2). Assembly and locking mechanisms are arranged in part on the infant carrier (2) and in part on the frame (3). The disembly and locking mechanisms selectively interconnect to permit detachable installation of the infant carrier (2) on the frame (3). The frame (3) includes pivotally connected supports (20, 21) and is without a handle.

14 Claims, 12 Drawing Sheets

TRANSPORT VEHICLE FOR AN INFANT OF LOW AGE

BACKGROUND OF THE INVENTION

The present invention concerns a pushcart or stroller type transport vehicle for a young infant. A stroller is comprised of an infant receiving receptacle, well known on its own, mounted on a frame. The said frame is equipped with wheels. A handle allows for the steering of the pushcart and, for example, raising its wheels for clearing a sidewalk.

The existing pushcarts or strollers have the drawback of a relatively complicated structure and, consequently, their manufacture is expensive. In fact, the body of such strollers must have a frame for supporting the receptacle and the body. Additionally, a handle must be mounted in a pivoting or sliding fashion relative to the support of the frame in order to be retractable when folding the frame, so that it may be stored away or placed in the trunk of a car with reduced volume.

Because of this complex structure, the frames of the existing strollers are relatively heavy.

Moreover, in an unfolded state, the strollers are usually significantly large. This may limit access to certain locations, e.g., the use of an elevator. Similarly, large strollers may prove to be a nuisance in certain locations, such as restaurants or other public places.

The present invention proposes to remedy all of these drawbacks.

SUMMARY OF THE INVENTION

Thus, the stroller comprises, a receptacle for receiving an infant, a frame equipped with wheels on which the receptacle can be mounted, and a handle permitting the steering of the stroller. The receptacle comprises a shell and handle and presents a relatively rigid structure, with the ends of the handle being mounted in a pivoting fashion on the two opposing sides of the receptacle; additional assembly and locking means are arranged, on the one hand, in the receptacle, and, on the other hand, on the frame in order to permit detachable installation of the receptacle on the frame. The frame is comprised of two supports and does not have a handle.

Additionally, the receptacle comprises a shell of molded synthetic material.

According to another feature of the stroller, the frame is comprised of two supports, which may pivot in relation to each other ranging between an inactive position of storage to an active position of deployment.

According to another specific embodiment of the stroller, the additional assembly mechanism permits assembly of the receptacle and the body in at least two distinct places in a longitudinal plane.

In accordance with an additional embodiment of the stroller the assembly of the receptacle on the frame cannot take place until the supports of the frame are in the active position of deployment.

According to another aspect of the stroller, the assembly and disassembly of the frame and of the receptacle cannot take place until the handle is in the position of assembly or the position of insertion in relation to the shell.

According to another embodiment of the stroller, the locking of the receptacle to the frame is effected by pivoting the handle of the receptacle.

According to a variation of one embodiment of the stroller, the additional assembly mechanism comprises two assembly elements, respectively supported by the supports of the frame and two assembly elements supported by the receptacle which may cooperate with the two assembly elements of the frame.

According to this variation of the embodiment of the stroller, the assembly elements of the frame are comprised of a projection, integral with one support and an axle housing, integral with the other support. The assembly elements of the receptacle comprise a cut-out located in the shell which cooperates with the projection so that a portion of the integral axle may be introduced into the housing during the pivoting of the handle.

According to another embodiment, the axle houses an insertion slot and the axle has two parallel flat pieces whose gap is equal to the width of the insertion According to another aspect of the stroller, the mechanisms provided for immobilizing the handle are adapted to also permit the immobilization of the handle in another inclined position, in such a manner that the stroller can be used with the infant turned either towards the person handling the stroller or towards the ground.

Furthermore, the stroller may contain a frame that is comprised of articulated two supports around a pivot axis, between a storage position and an active deployment position, with each of the supports comprising an assembly element which permits the assembly of a receptacle.

According to another aspect of the stroller, the frame comprises locking and unlocking mechanisms destined to permit the locking and unlocking of the articulation between the supports when it is in the position of active deployment.

In addition, the stroller may contain a receptacle for the stroller that has assembly and locking elements that permit its assembly and locking on the frame and that allow a handle for manipulation, pivotally mounted on the shell and capable of being immobilized by an additional arrest mechanism, in several different positions with respect to the shell.

Furthermore, an additional feature of the receptacle, would allow the handle to secure the locking of the receptacle on the frame when the handle is in a position other than in the assembly and insertion position.

Still other advantages and benefits of the invention will become apparent to those skilled in the art upon a reading and understanding of the following detailed description.

BRIEF DESCRIPTION OF THE INVENTION

The invention may take form in various components and arrangements of components, and in various steps and arrangements of steps. The drawings are only for purposes of illustrating the preferred embodiments and are not to be construed as limiting the invention.

FIGS. 1–4 depict a first specific embodiment and its variations of the embodiment of the stroller:

FIGS. 5 to 12 illustrate a second specific embodiment of the stroller:

FIG. 9b depicts the receptacle in a deck-chair position, similar to the position in FIG. 9a;

DETAILED DESCRIPTION OF THE PREFERRED EMBODIMENTS

With reference to the FIGURES, a stroller 1 is provided for an infant of low age, comprising a receptacle or carrier 2 capable of being mounted in a detachable manner on a frame 3.

According to one embodiment, the stroller 1 is formed by a frame 3 without the handle, constituted by two support legs 20, 21 pivotally mounted between an inactive storage position A (FIG. 6a) and an active position of deployment B (FIG. 6b) in which it may receive the receptacle 2. The receptacle or carrier 2 is fitted with a handle 6 which specifically permits the holding and advancement of the stroller. The receptacle 2 comprises a shell 5 of molded synthetic material and a handle 6 in the shape of an inverted U, mounted pivotally on the two opposite sides of the shell 5.

According to a first specific embodiment of the stroller illustrated in FIGS. 1 to 4, the shell 5 has a bottom wall 7 forming an inclined seat for an infant of low age, and two longitudinal cross-pieces 8 whose lower edge 8a is rounded in order to permit the possibility of balancing the receptacle 2 when being placed on a surface. The wall 7 is curved in an upward direction at one end of the shell 5 in such fashion that a space 9 is created between said wall 7 and the two cross-pieces 8. Shell 5 receives some padding (not represented) on which the infant can be placed.

The wall 7 defines two rectangular port-holes 10 and carries a transverse bar 11 attached to the shell 5 connecting the two cross-pieces 8 in space 9. The free end of each lateral branch 6a of handle 6 ends in a circular part 15 which is in the shape of a cap that pivots around a pin 16, an integral part of the corresponding side of the shell 5. The parts 15 and the pins 16 are equipped with additional arrest mechanisms or stops which come into contact under the action of elastic or resilient-biasing elements in order to immobilize the handle 6, for example, in the inclined position represented by solid lines in FIG. 1 or 2, in the vertical position represented by dotted lines in FIG. 2, or in the inclined position indicated by dotted lines in that same FIGURE. These means can be disengaged, specifically by separating parts 15 and pins 16 from contact with said elastic elements in order to permit pivoting of the handle 6 between these positions. The pivoting is permitted by using grooves and radial channels arranged on the surfaces with respect to parts 15 and pins 16 which are normally kept mutually engaged by coaxial springs placed between these parts 15 and pins 16.

Figure 1:
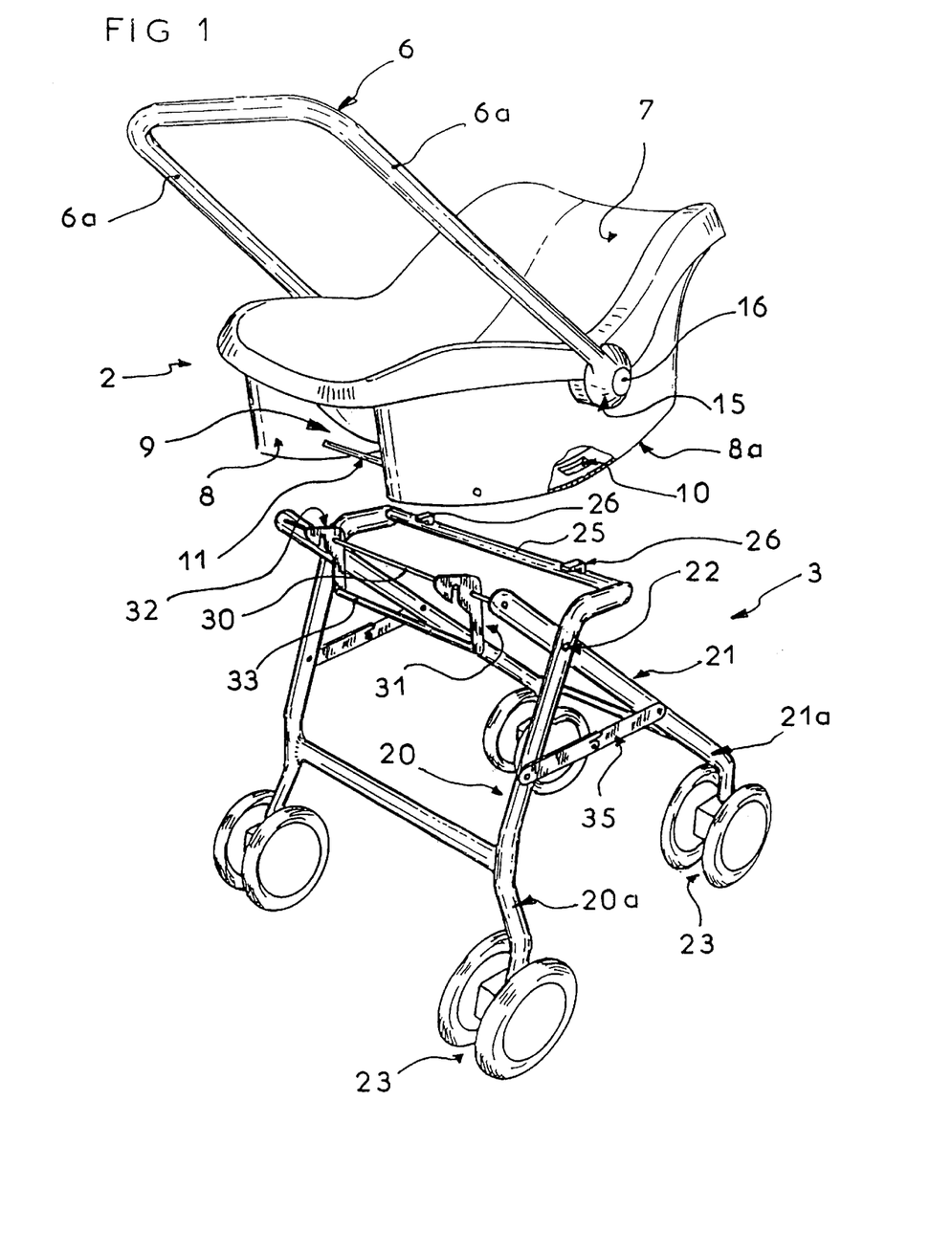
FIG. 1 is a perspective view prior to assembly, with partial extraction.
Figure 2:
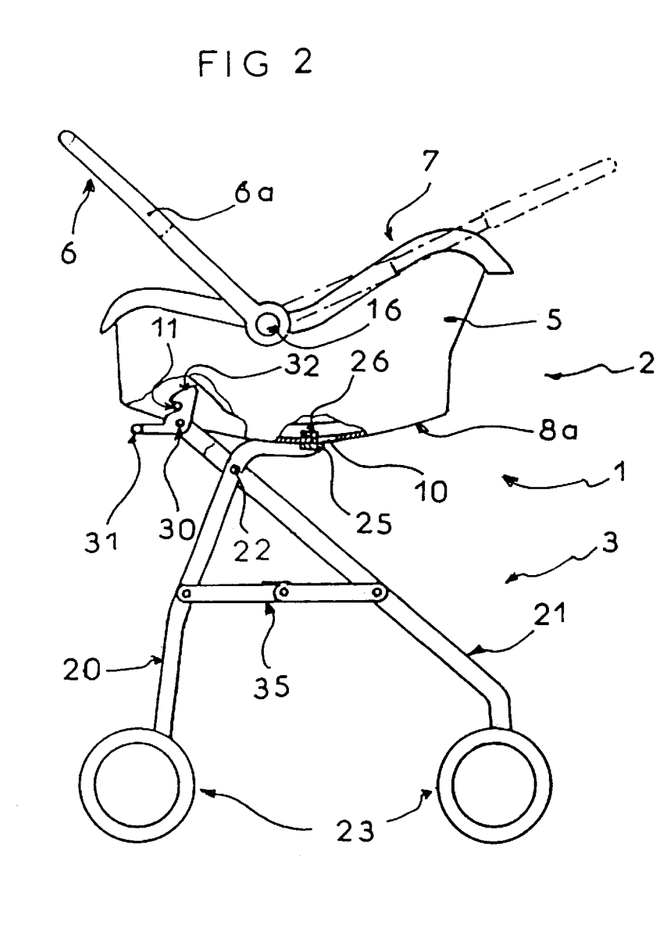
FIG. 2 is a profile view with partial extraction after assembly.
Figure 3:
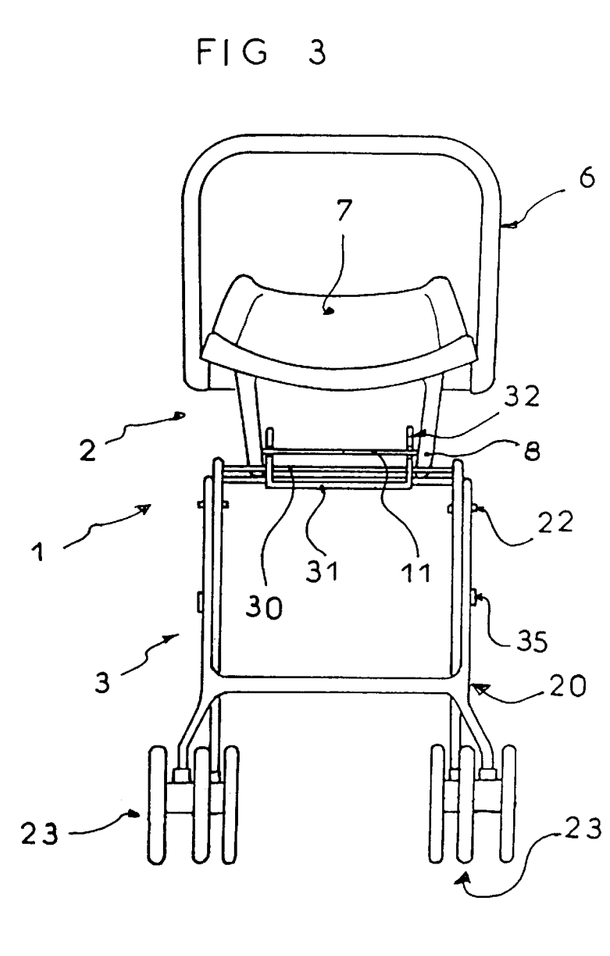
FIG. 3 is an end view.

According to the first specific embodiment illustrated in FIGS. 1 to 4, the frame 3 comprises two supports 20, 21 pivotally mounted in relation to each other at the level of their upper zone, around axes 22 and is comprised of pairs of wheels 23 at their lower portions. The upper ends of lateral branches 20a of each support 20 are connected with each other by a cross piece 25 on which are fastened two curved brackets 26. These brackets 26 can be passed through the port-holes 10 and be engaged behind the wall 7 as is depicted in FIG. 2.

According to this first specific embodiment, the locking mechanism of the receptacle 2 on the frame 3 present a particular configuration. The upper ends of branches 21 of the other support 21 are connected to each other by a rod 30, pivotally mounted in relation to the same. Said rod 30 comprises a locking mechanism 31, forming an integral part of the same, presenting two pieces 32 in the shape of a hook and a transverse manipulation bar 33. Each of the pieces 32 has a notch capable of being engaged under friction around a rod 11 when the brackets 26 are engaged behind wall 7. This ensures, as is more clearly depicted in FIG. 2, the locking of the receptacle 2 to the frame 3.

In addition, two pairs of small connecting rods 35 are joined with each other at one of their extremities and are each connected at their other extremity to one of the two supports 20, 21. These pairs of small connecting rods 35 limit pivoting of the supports 20, 21 in order to define the deployment position of the frame 3 shown in FIGS. 1–4.

Figure 4:
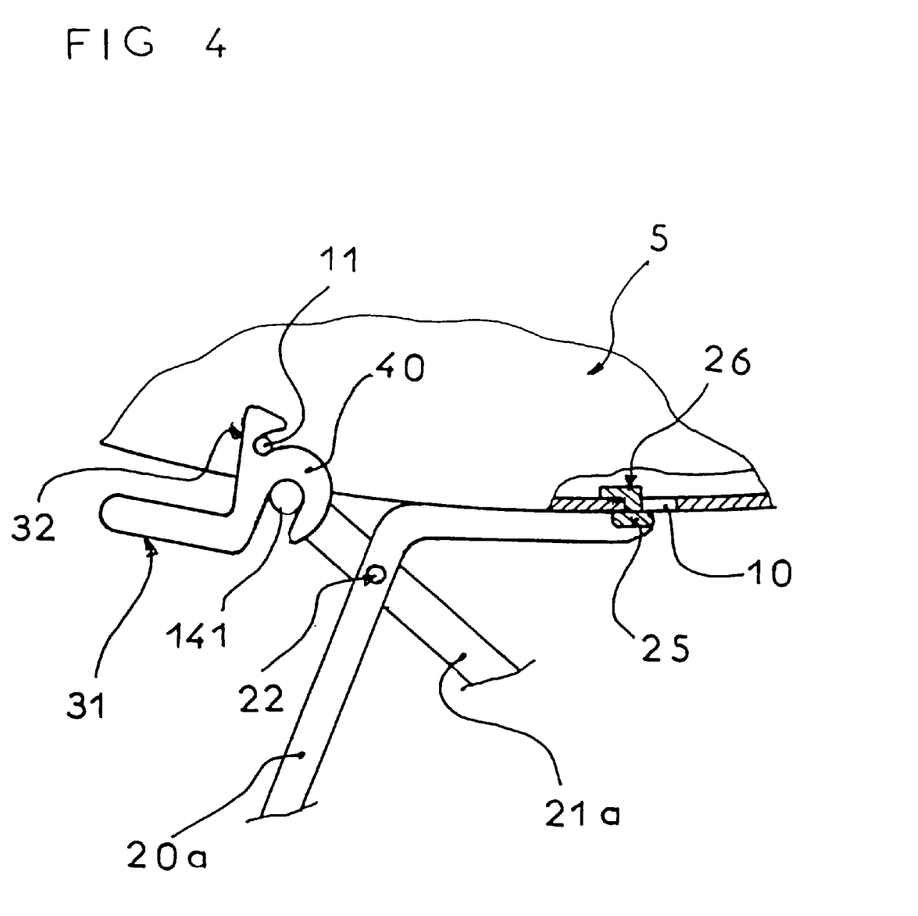
FIG. 4 is a partial profile view an in enlarged scale according to a variation of the embodiment.

FIG. 4 indicates a variation of the first specific embodiment of the stroller 1 in which, for the sake of simplification, the already described pieces or elements are identified by the same reference numbers. In this case, the locking element 31 has rounded pieces 40 which can pivot around a cross-piece 141 linking the upper ends of the branches 21 in such a manner that the parts 32 in the shape of a hook could be engaged around a rod 11.

Figure 5:
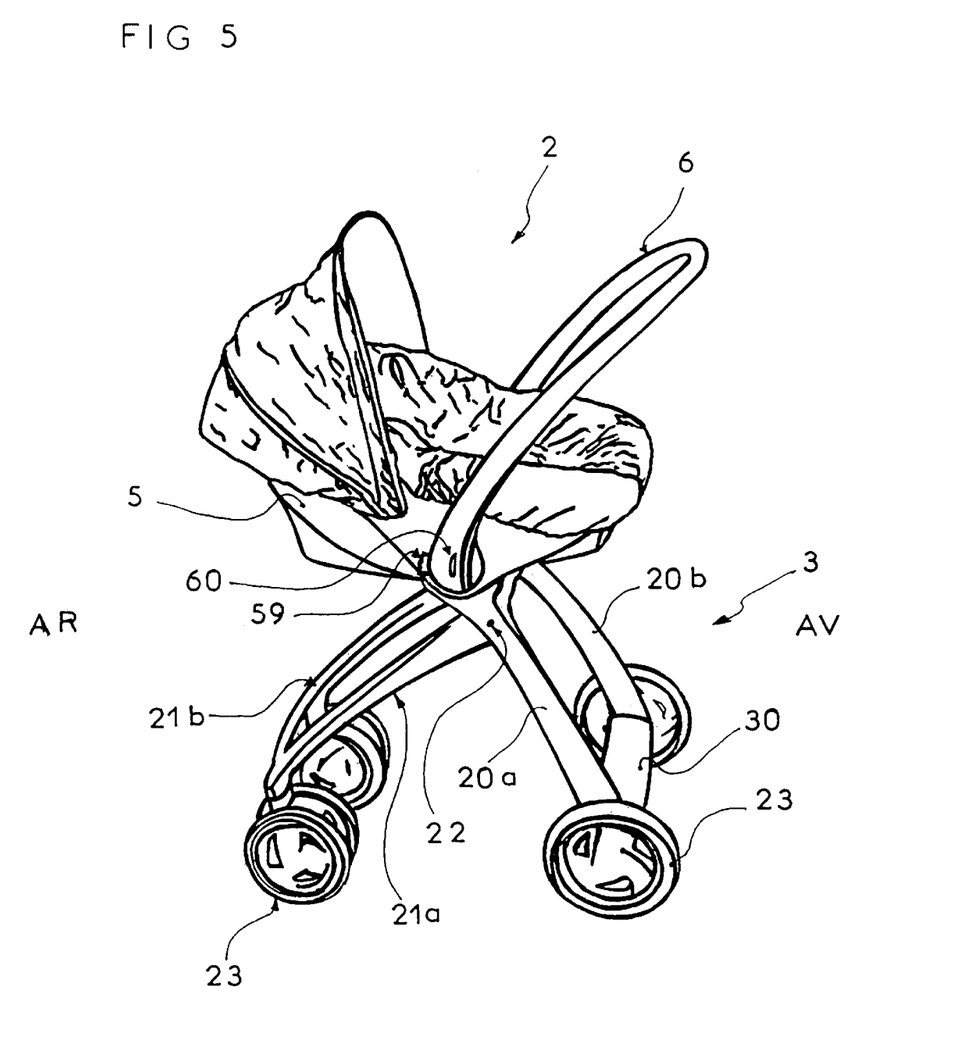
FIG. 5 depicts a perspective view of the second specific embodiment of the stroller.

With reference to FIG. 5 and according to a second specific embodiment of the invention, the stroller 1 has a receptacle or carrier 2 whose shell is made of a plastic material. The handle 6 of the stroller 1 is an integral part of the receptacle 2 and can be immobilized or locked in several positions in relation to the shell 5. The receptacle 2 is destined to be assembled and locked to the frame 3 by an additional assembly and locking mechanism. The frame 3 is formed by two supports 20, 21 articulated between each other around a transverse axle 22. It should be noted that the frame lacks a handle to hold and direct it—instead, the handle connected the receptacle is used, which is, in fact, innovative.

According to this second specific embodiment, the frame 3 and more specifically its supports 20, 21 are constituted by plastic profiles. Thus, the shape and the dimensions of the legs 20a, 20b, 21a, 21b forming supports 20, 21 vary in length. The rear support 21 formed by its two legs 21a, 21b presents a section of evaluative shape, the dimensions of which increase from the wheels 23 toward the axle of articulation 22. Conversely, the front support 20 presents legs 20a, 20b, the dimensions of which decrease from the wheels 23 toward the axle of articulation 22 as depicted in FIG. 5.

Figure 6A:
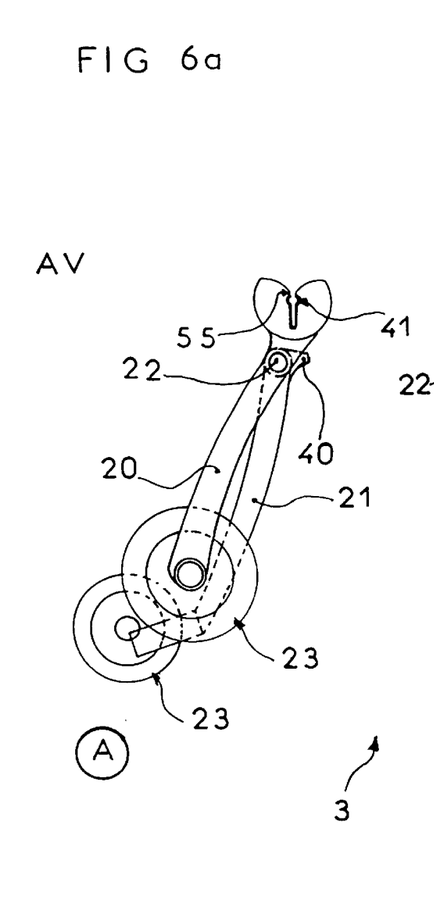
FIG. 6a represents a lateral view of the frame in inactive position of storage.
Figure 6B:
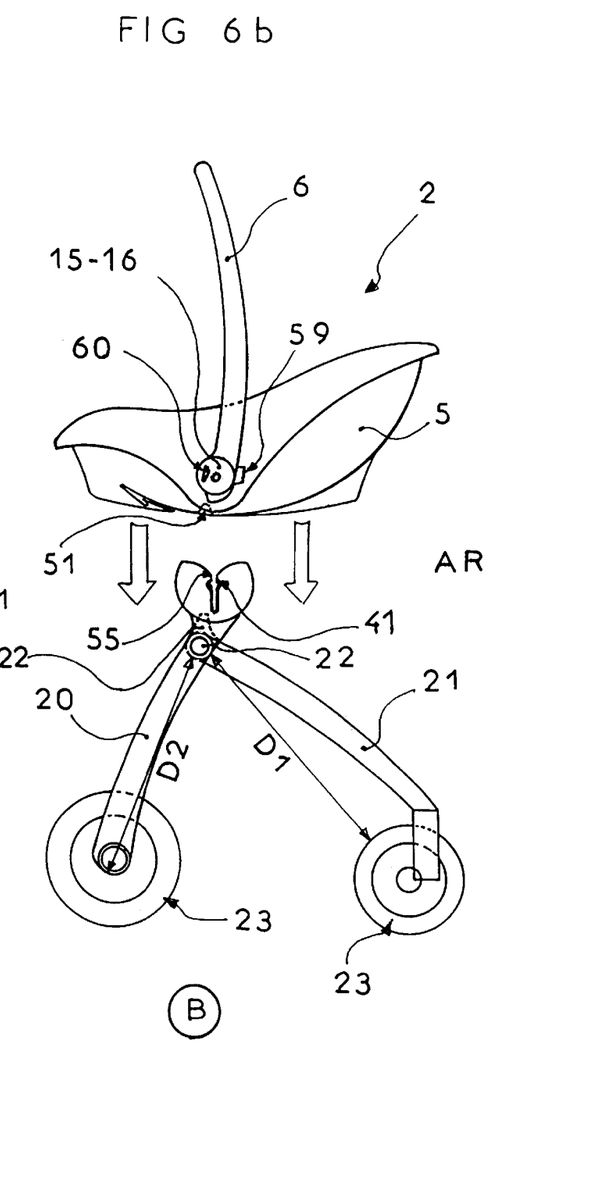
FIG. 6b represents a lateral view of the frame in a deployed position and the receptacle in a position of assembly.
Figure 7:
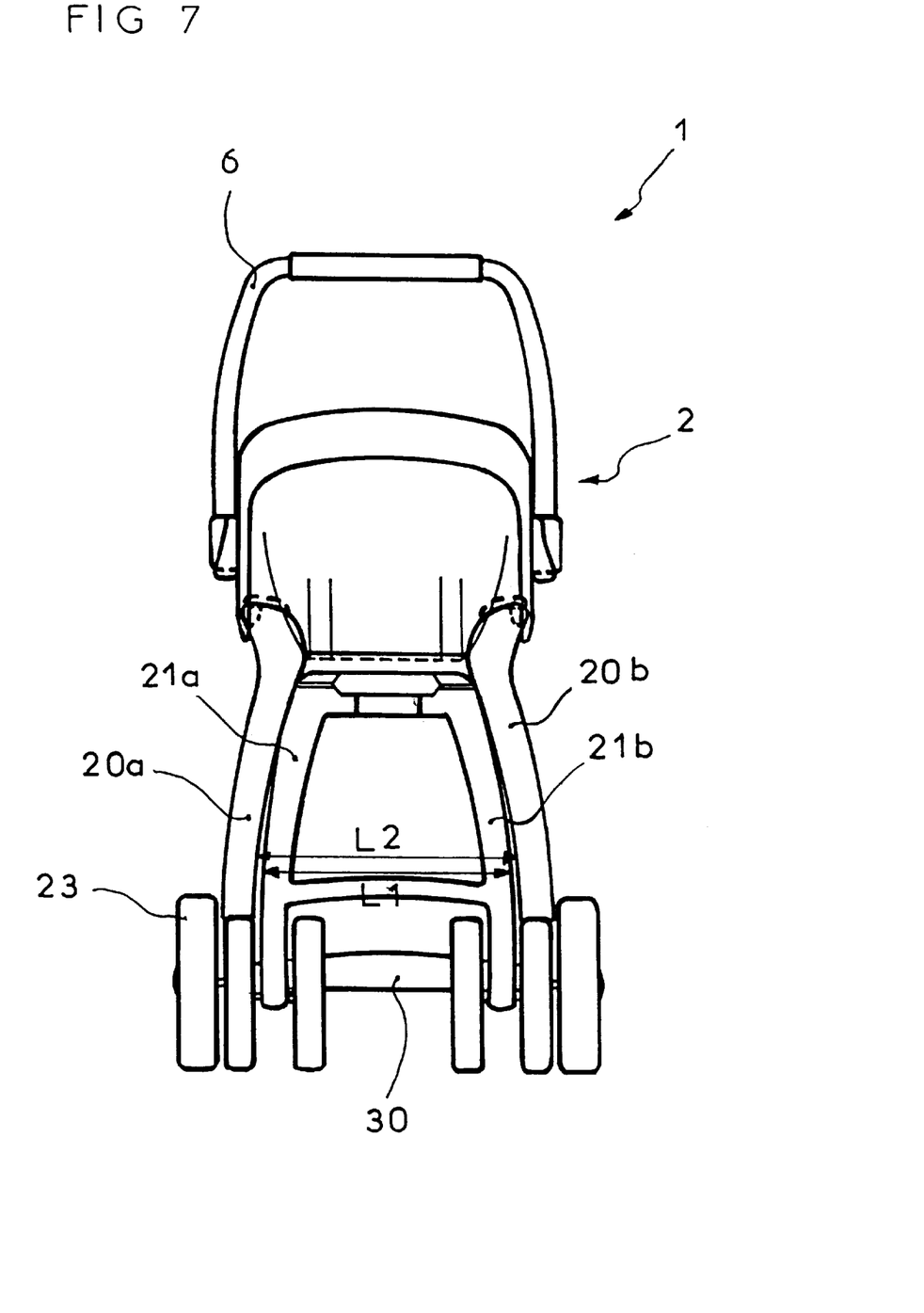
FIG. 7 depicts the stroller according to a rear view.

According to the second specific embodiment and as shown in FIGS. 6a and 7, the front and rear supports 20, 21 present a configuration that facilitates folding the frame 3 in such a manner so as to obtain minimum storage volume when in an inactive position. In order to accomplish this, a width L1 between the external wall of the legs 21a, 21b of the rear support 21 is smaller than a width L2 between the internal wall of the legs 20a, 20b of the front support. It should be noted, as indicated in FIG. 6b, that a length D1 between the pivot axis 22 and the top of the wheels 23 carried by the rear support 21 is greater than a distance D2 between said pivot axis and the front cross-piece which carries the wheel axis 23 of the front support 20; this beneficially allows the rear wheels 23 to position themselves in the extension of the front support legs 20 when the frame 3 is in the inactive storage position A as indicated in FIG. 6a.

According to this second embodiment of the stroller, the additional assembly and locking means destined to permit fastening and locking of the receptacle 2 on the frame 3 are carried, on the one hand, by the frame 3 and, on the other hand, by the receptacle 2. They are beneficially constituted by a male-type assembly elements 40, 50 destined to cooperate with female-type assembly elements 41, 51. It should be noted that according to this second specific embodiment the frame 3 comprises a male element 40 and a female element 41 whereas the shell respectively presents a female element 51 and a male element 50.

Figure 6C:
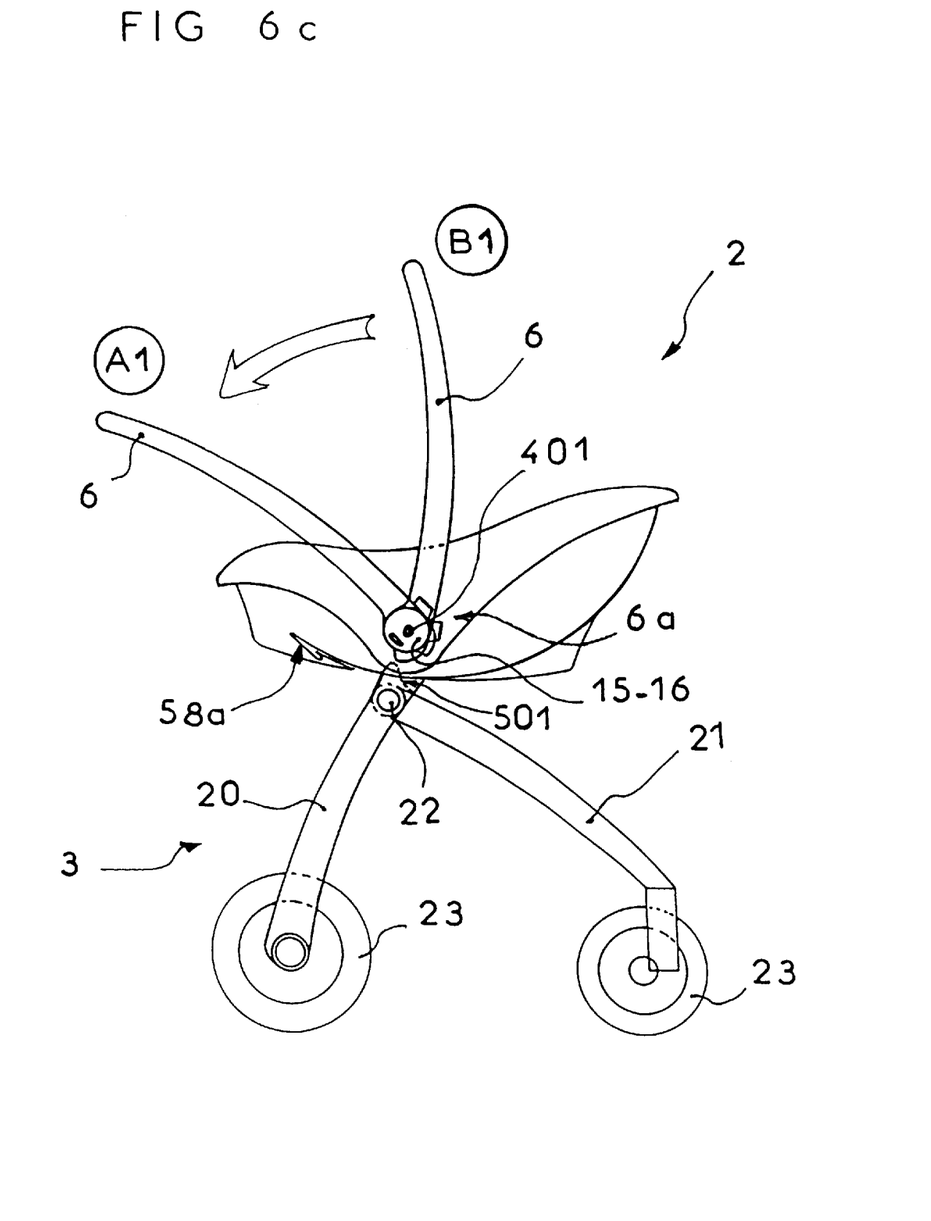
FIG. 6c represent a lateral view of the assembled frame and receptacle.

According to the second embodiment, cooperation between the respective assembly and locking elements takes place in at least two distinct places 401, 501 in a longitudinal plane, as indicated in FIGS. 6b and 6c. It goes without saying that the stroller 1 having a longitudinal plane of general symmetry, these two fastening locations 401, 501 and the assembly elements 40, 41, 50, 51 are located symmetrically on the other side of the stroller 1. One notes, that in two places, with different locations, there are respective projections in a longitudinal plane.

It should be noted that the assembly in two different locations 401, 501 avoids receptacle pivoting around one of the two assembly points. According to the second specific embodiment of the stroller, the receptacle 2 has a cut-out 51 in its shell 5, which cooperates with a projection 40 of the frame 3 and part of the axle 50 which, in turn, cooperates with a corresponding axle housing 41 of the frame 3.

It is important to note that the two assembly elements 40, 41 of the frame 3 which form the two fastening locations 401, 501 are supported by the supports 20, 21 and are thus movable toward each other in pivoting around the pivot axle 22 of the supports 20, 21. In that fashion, assembly of the receptacle 2 on the frame 3 can only take place when the supports 20, 21 are in a position of active deployment B, inasmuch as the assembly elements 40, 41 carried by their respective supports 20, 21 cannot assume a position where they are capable of cooperating with the supplementary elements 50, 51 of the receptacle 2 unless the frame 3 is in its position of deployment.

Figure 8A:
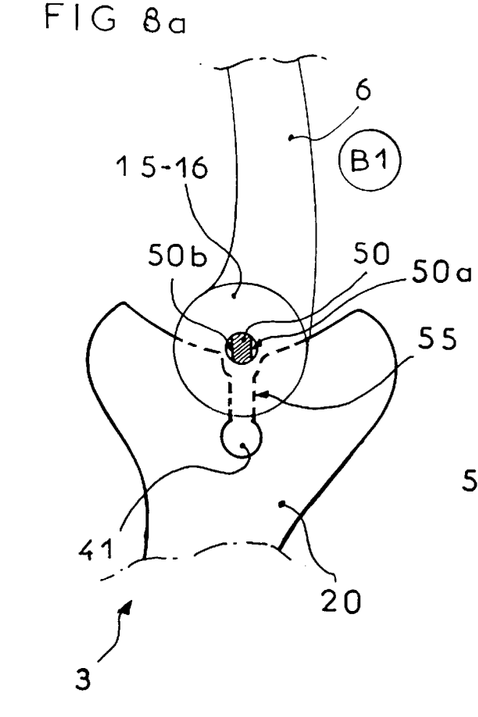
FIGS. 8a to 8c depict a schematic view of the assembly and the locking of the receptacle on the frame.
Figure 8B:
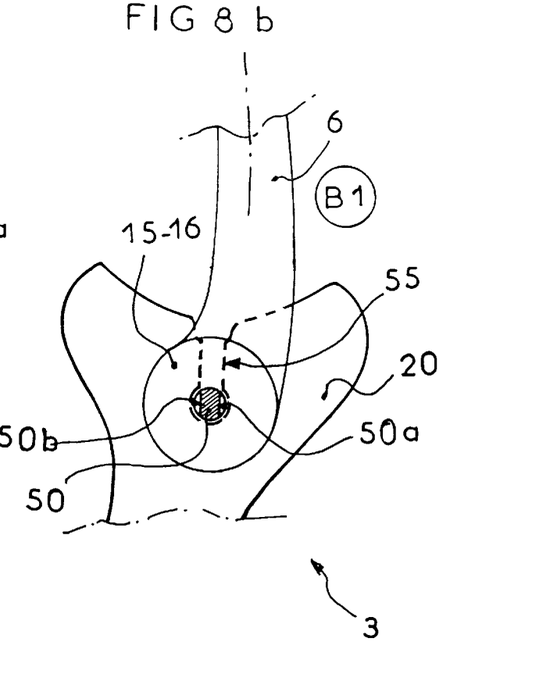
Figure 8C:
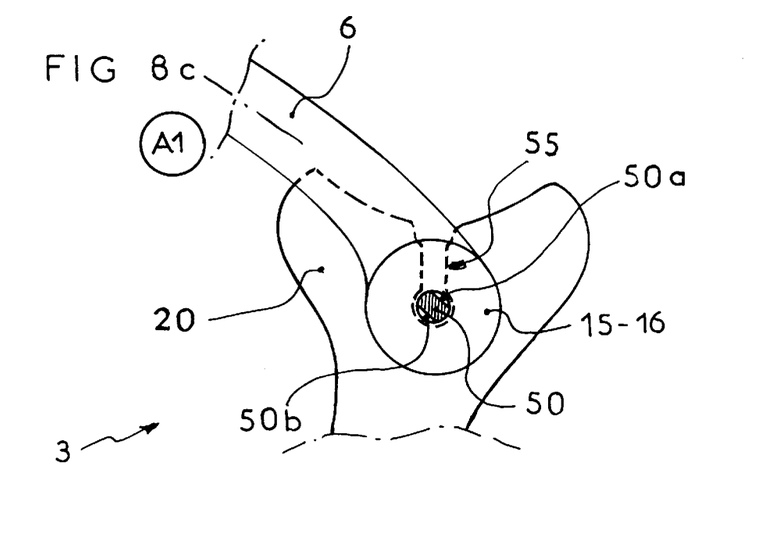

According to this second specific embodiment of the stroller, one of the assembly elements of the receptacle 2 forms an integral part of the movement of the handle 6; whereas, the other assembly element forms an integral part of the shell 5 in such manner so that cooperation of the assembly elements 50, 51 of the stroller 2 with the respective supplementary elements 40, 41 of the frame 3 can only take place in a certain position of the handle 6 vis-a-vis the shell 5, i.e., the assembly or insertion position Bi (FIGS. 8a, 8b). Thus, the shell 5 has a cut-out 51 located laterally in its wall, destined to cooperate with a projection 40 which is an integral part of the rear support 21 whereas the handle 6 supports, at the level of the circular portion 15, at the free end 6a, part of the axle 50 which has two parallel flat surfaces 50a, 50b destined to permit introduction via an insertion slot 55 of part of the axle in its additional housing 41 located on the front support 20. It should be noted that the width of the insertion slot 55 is equal to the approximate play of the width separating the flat surfaces 50a, 50b; whereas, the housing of the axis 41 has the same diameter as the portion of the axle 50, as shown in FIGS. 8a, 8b, 8c, which depict their cooperation. Consequently, when the portion of the axle 50 pivots in its housing 41, it is locked and incapable of moving out again until the flat surfaces are in the direction of the slot, or in other words, until the handle is in its assembly position or its position of insertion.

According to this second specific embodiment, the cooperation of the four respective assembly elements 40, 41, 50, 51 of the receptacle 2 and the frame 3 permit complete locking of the assembly. It is important to note that assembly and disassembly cannot take place unless the frame is in a position of active deployment B and the receptacle displays the handle 6 in a position of active assembly B1, illustrated in FIGS. 6b, 8a, and 8b, or unless the handle 6 is substantially perpendicular to the shell 5 and held in an obviously vertical plane. Once assembled, pivoting of the handle provokes pivoting of part of the axle 50 in its housing 41 and causes locking of the receptacle. It is obvious that the assembly means of the receptacle on the frame could, for example, also have a different configuration, either in number or in shape, without going outside the limitations of the protected field of the invention.

Figure 9A:
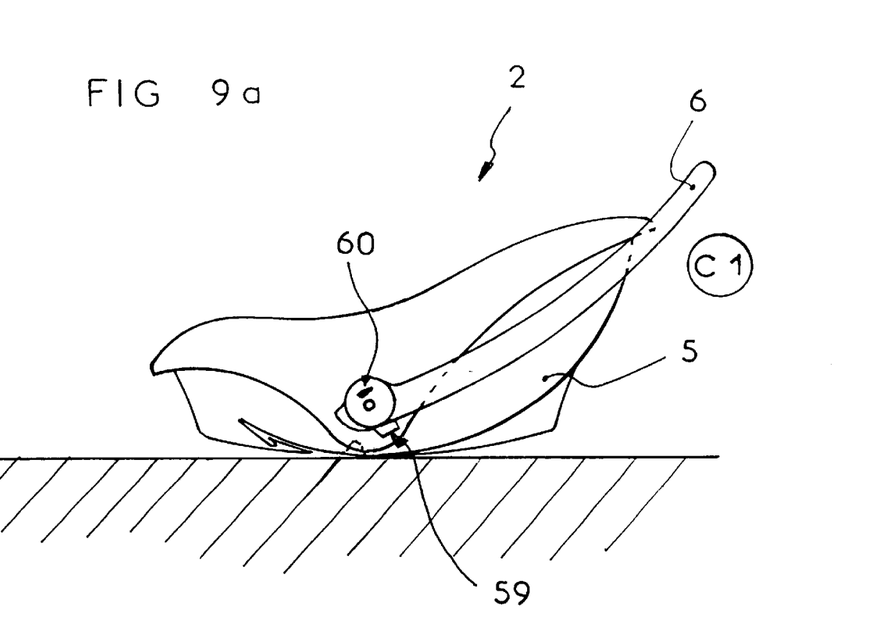
FIG. 9a represents a lateral view of the receptacle in position of storage.
Figure 9B:
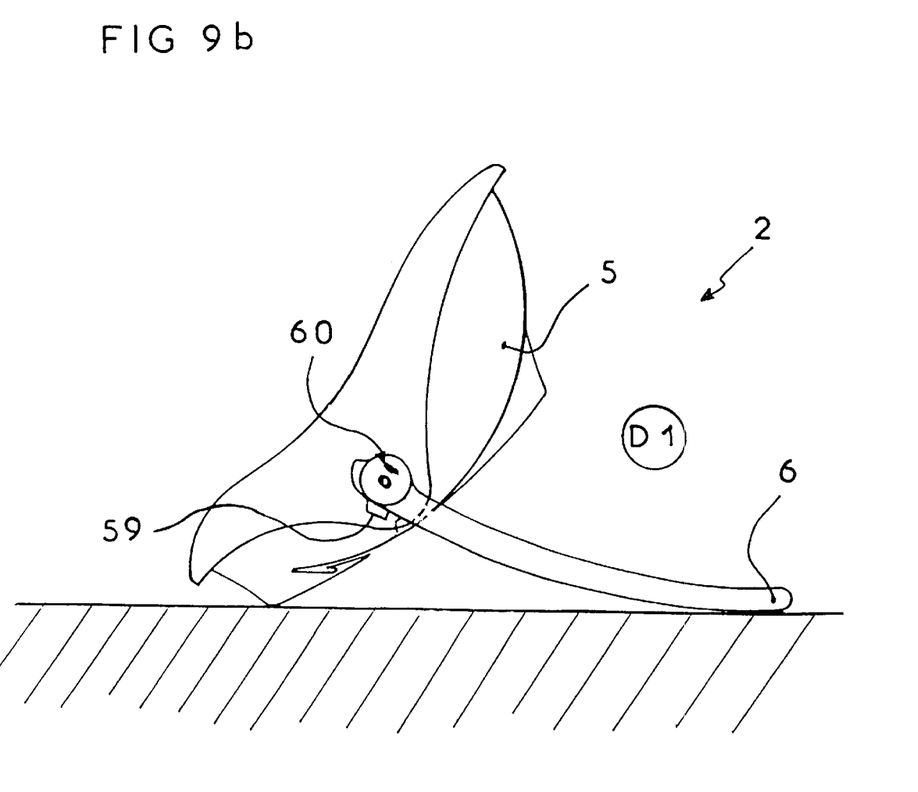

In addition, one might note that an additional stop 15, 16 situated on the free end 6a of the handle 6 beneficially allow for positioning of the handle in four locked positions in relation to the shell 5, namely in push position Al illustrated in FIG. 6c, in which the user can advance the stroller 1, a position of introduction B1, a position called "storage position" C1 where the handle is substantially in backward position, illustrated in FIG. 9a, and a position called "Transat" or deck-chair D1, where the handle extends to the rear of the shell 5 in order to constitute a support on the ground for the purpose of arranging the receptacle 2 as a seat, as shown in FIG. 9b.

It should be noted that the positioning of the handle 6 in its various positions is effected with the aid of the additional stops 15, 16. This beneficially presents an operational dual safety device, in other words there are two unlocking elements 59, 60 and stops 15, 16 which must be actuated simultaneously in order to permit a change in the position of the handle 6. The unlocking elements 59, 60 can be formed, for example, by buttons or levers located on the pin 16 or the handle 6.

Figure 10:
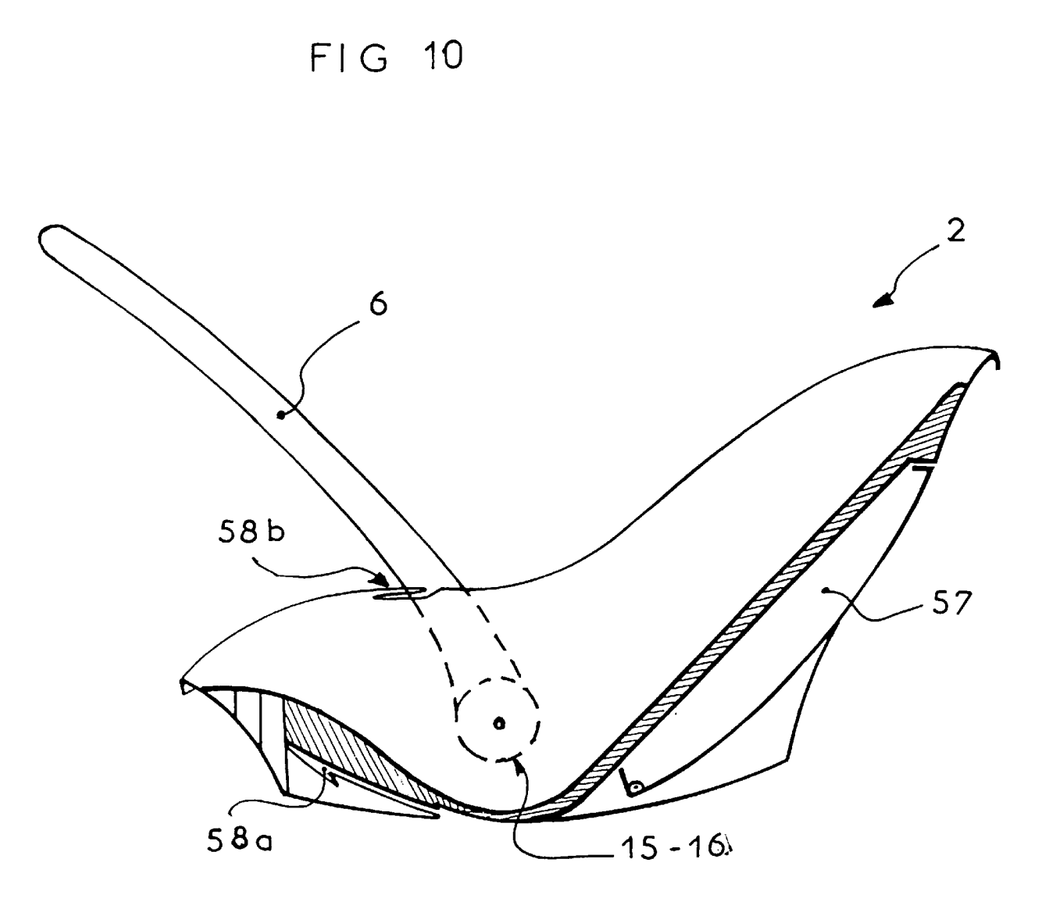
FIG. 10 shows a longitudinal view of the receptacle in partial section.

According to this second specific embodiment, the shell 5 of the receptacle 2 has a storage space in its rear portion. Said storage space can be realized by an enclosed case or compartment 57 situated in the back of the seat, as shown in FIG. 10. The shell 5 also has loops or anchoring points 58a, 58b destined for passage of the seat belt when the receptacle or carrier is placed in a vehicle.

Figure 11:
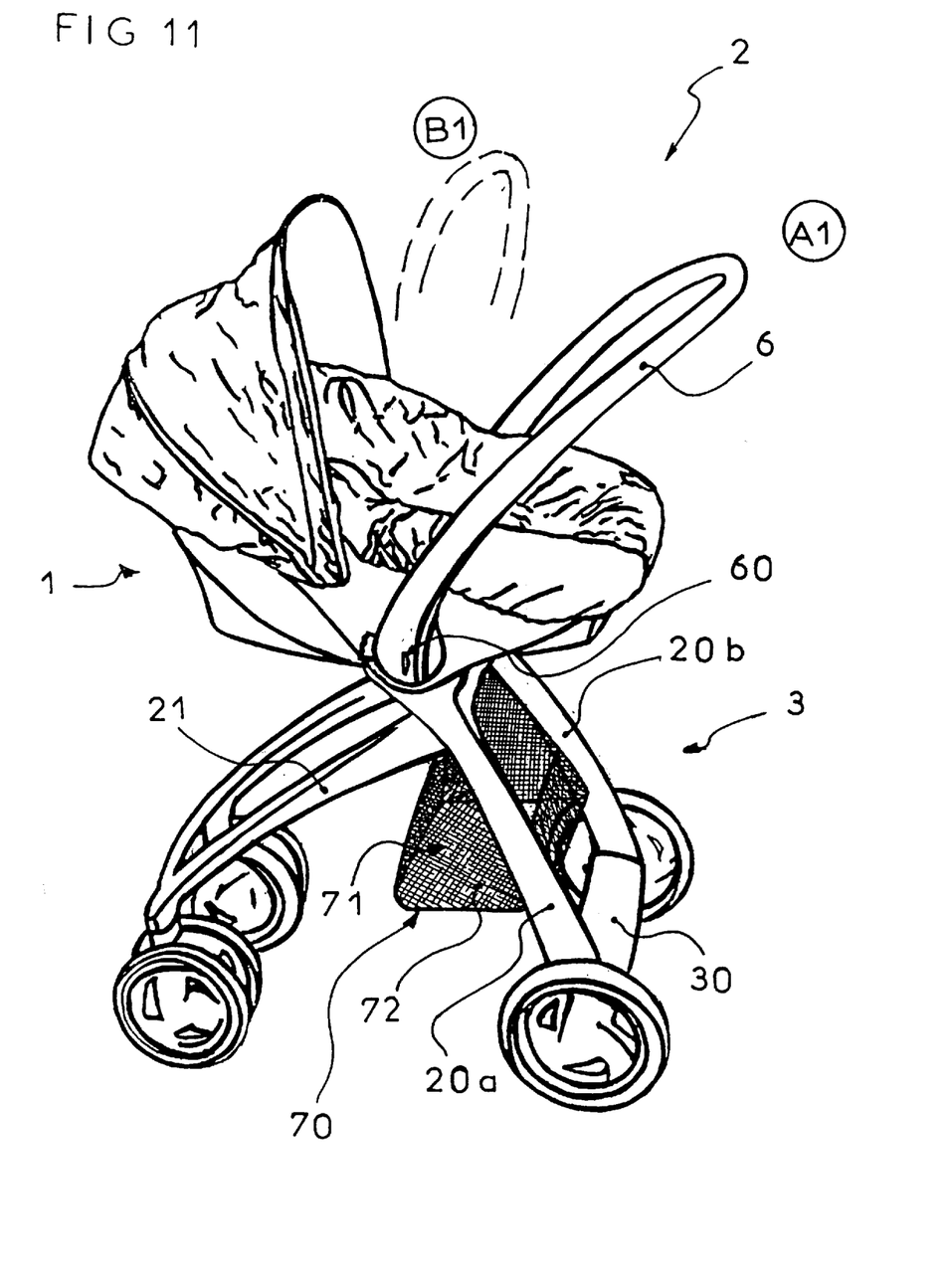
FIG. 11 shows a perspective view of a variation of the embodiment of the stroller; and, FIG. 12 represents a lateral view of another variation of embodiment of the stroller.

Furthermore, according to a variation in embodiment illustrated in FIG. 11, the frame 3 has a storage space 70, formed, for example, by a net 71 and a rigid plate 72, said space being beneficially positioned between the legs 20a, 20b of the front support 20.

Figure 12:
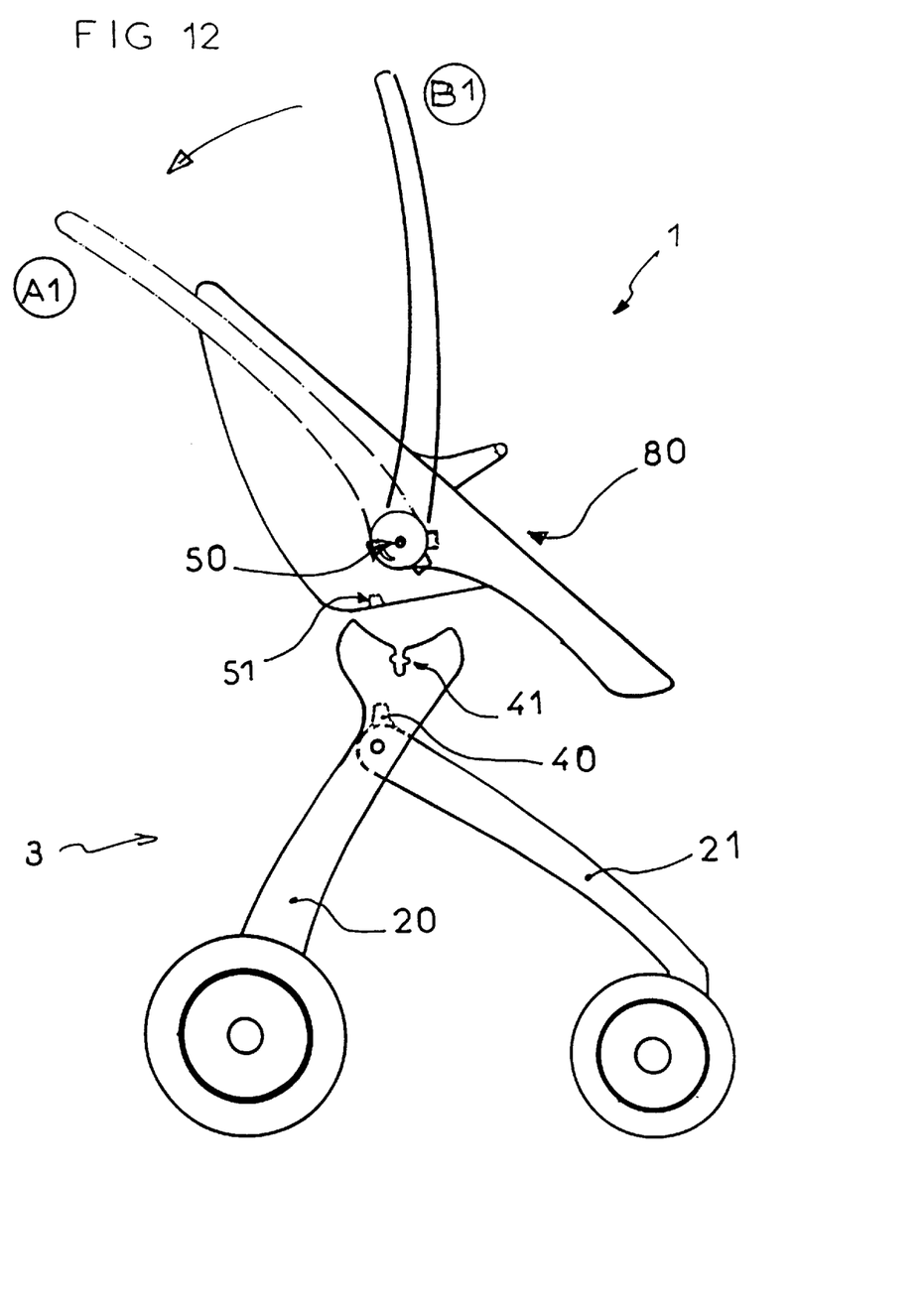

According to another variation in embodiment, the frame 3 is identical to the frame of the second specific embodiment—it is constituted by two supports and without handle. It is destined to receive a seat structure 80 which comprises the assembly elements 50, 51 identical to those of the preceding embodiment, as shown in FIG. 12. This seat structure is destined to permit formation of a stroller 1 where the infant is in essentially sitting position.

It should also be noted that the rear supports carry at the end, in known fashion, sets of pivoting wheels destined to facilitate execution of stroller turns.

According to the invention, all the elements which form part of the stroller, except for the padding, can be beneficially realized by means of molded plastic material.

According to a non-represented variation of an embodiment of the stroller, the frame comprises locking and unlocking elements which permit the locking of the supports in an active deployed position. The locking elements can beneficially be constituted by a stop arranged on one of the supports, in proximity to the articulation and resiliently biased for locking the other support, upon attaining a position of active deployment. Said stop must then be acted upon, by the user, against the resilient biasing mechanism, so as to permit pivoting of the supports toward their folded storage position.

It is understood from the preceding variation that the locking of the receptacle 2 on the frame 3 is effected by pivoting the handle 6 of the receptacle 2 from its assembly and insertion position Bi towards its position of pushing A1. Conversely, the unlocking of the receptacle 2 is done by pivoting the handle in the other direction, in other words, pivoting from its pushing position A1 towards its assembly and insertion position B1.

The invention thus provides a push-cart stroller for infants of low age, having a simple structure which can be manufactured at low cost, which is light, easy to manipulate, not cumbersome and permits easy carrying of the receptacle.

It goes without saying that the invention is not limited to the embodiments described herein by way of example only, but that it includes also all variations of embodiments. Thus, the handle 6 can have a single-unit structure, as is demonstrated in the design, or it can have lateral telescopic branches as indicated by dotted lines of FIG. 2, in a manner that the length of these lateral branches might be adjusted commensurate with needs. Mechanisms, such as a series of holes set apart, arranged on one of the telescopic pieces and a small projecting nipple, which is an integral part of the other telescopic piece, can be selectively engaged in any of the mentioned holes, permitting adjustment in length of the telescopic branches; inclined positions, other than the ones shown in FIG. 2, are possible.

The invention has been described with reference to the preferred embodiments. Obviously, modifications and alterations will occur to others upon a reading and understanding of the preceding detailed description. It is intended that the invention be construed as including all such modifications and alterations insofar as they come within the scope of the appended claims or the equivalents thereof.

What is claimed is:

1. A stroller for a young infant, the stroller comprising:
   a handle-free frame including:
      two sections, both equipped with wheels and neither equipped with a handle,
      an infant carrier mounting assembly adapted to mount an infant carrier;
   an infant carrier including:
      a shell having a relatively rigid structure,
      a handle having ends mounted in pivoting fashion on opposite sides of the infant carrier shell; and
      a locking assembly arranged on the infant is carrier and on the frame in order to lock the frame and the infant carrier shell together, and permit detachable installation of the infant carrier on the frame, the handle being pivotable between a raised locking position and a lowered lock release position for permitting the infant carrier to be detached and removed from the frame, and pressure on the handle exerting turning and propelling forces directly to the attached shell and frame.

2. The stroller according to claim 1 wherein the infant carrier shell is of molded synthetic material.

3. The stroller according to
   a pivot assembly which mounts the two sections in a pivoting relation to each other to pivot between an inactive storage position and a position of active deployment.

4. The stroller according to claim 3 wherein installation of the infant carrier on the frame is blocked until the two sections of the frame are disposed in the position of active deployment.

5. The infant stroller according to claim 3 wherein the locking assembly is mounted at least in part in the pivot assembly such that pivoting the handle to a position for pushing and guiding the stroller concurrently locks the infant carrier to the frame.

6. The stroller according to claim 1 wherein the two frame sections are articulated around a pivot axis between a storage position and a position of active deployment, each of the frame sections including an assembly element for selective interconnection with the infant carrier.

7. The stroller according to claim 6, further including:
   locking and unlocking elements on the frame sections for permitting blocking and unblocking of articulation between the supports when in the position of active deployment.

8. A stroller for a young infant, the stroller comprising:
   a frame having two pivotally connected sections which are movable between a folded storage position, and a deployed position, the section being equipped with wheels;
   an infant carrier having a relatively rigid shell to which ends of a handle are pivotally mounted to pivot between a locking position and release position;
   a locking assembly having portions disposed on the frame and the shell for selectively locking the infant carrier shell to the frame and releasing the shell from the frame in response to the handle pivoting between the locking position and the release position, such that the locking of the infant carrier on the frame is done by pivoting the handle of the infant carrier.

9. The stroller according to claim 8 wherein the locking assembly locks the infant carrier and the frame in at least two distinct places in a longitudinal plane.

10. The stroller according to claim 9 wherein the locking assembly includes first two assembly elements respectively carried by the frame and a second two assembly elements supported by the infant carrier for cooperating with the first two assembly elements of the frame.

11. The stroller according to claim 8 further including a means for immobilizing the handle in either of the two inclined positions, in such manner that the stroller can be utilized with the infant turned either toward the person guiding the stroller or facing the road.

12. The infant carrier according to claim 8, wherein the handle assures locking of the infant carrier on the frame when the handle is in the position other than an assembly and insertion position.

13. A stroller for a young infant, the stroller comprising:

an infant carrier;

a frame equipped with wheels on which the infant carrier is mountable, including two sections;

the infant carrier includes a shell which supports the handle and has a relatively rigid structure, with the ends of the handle being mounted in pivoting fashion on opposite sides of the infant carrier;

a locking assembly arranged on the infant carrier and on the frame in order to permit detachable installation of the infant carrier on the frame in at least two distinct places in a longitudinal plane, the locking assembly including:

a first two assembly elements respectively carried by each of the sections of the frame, the first assembly elements of the frame includes a projection integral with one of the sections and a housing of an axle integral with the other section, and;

a second two assembly elements supported by the infants carrier cooperating with the first two assembly elements of the frame, the second assembly elements of the infant carrier include a groove situated in the shell for cooperating with the projection as well as with a portion of an axle integral with the pivotal handle and for insertion into the housing.

14. The stroller according to claim 9 wherein the axle housing has an insertion slot and the axle portion has two parallel flat surfaces whose spacing is equal to the width of the insertion slot.

* * * * *